Patented May 24, 1949

2,470,841

UNITED STATES PATENT OFFICE 2,470,841

METHOD FOR THE SEPARATION OF HYDROXY ORGANIC ACIDS

William E. Barch, Bronx, N. Y., assignor to Standard Brands Incorporated, New York, N. Y., a corporation of Delaware No Drawing. Application June 5, 1946, Serial No. 674,665

13 Claims. (Cl. 260—536)

The invention relates to a method for the separation of hydroxy organic acids. More particularly it pertains to a separation of the tartaric acids, and includes correlated improvements and discoveries whereby the separation of such acids one from the other is facilitated.

An object of the invention is the provision of a method in accordance with which hydroxy organic acids may be separated practically quantitatively as their substantially pure salts from which the free acids may be recovered easily through treatment with a suitable acid.

Another object of the invention is to provide a method for the separation of hydroxy organic acids through utilization of a relatively concentrated solution of certain inorganic salts.

A further object of the invention is the provision of a method whereby hydroxy organic acids may be separated by treatment with a strong solution of calcium chloride which may be reused following the separation.

A still further object of the invention is to provide a method for the separation of hydroxy organic acids that may be readily, effectively, and economically practiced to a desired extent on a commercial scale.

A more particular object of the invention is to provide a method for separating tartaric acids from other hydroxy organic acids, especially for separating the tartaric acids from each other as the dextro acid from the meso acid, and other hydroxy acids, such as saccharic acid.

A specific object of the invention is to provide a method which effects a separation of calcium dextro, racemic, and meso-tartrates from one another and from calcium saccharate by treatment thereof with a strong calcium chloride solution followed by dilution and formation of basic calcium salts of meso-tartaric and saccharic acids by reaction with calcium hydroxide.

Other objects of the invention will in part be obvious and will in part appear hereinafter.

The invention accordingly comprises the several steps and the relations of one or more of such steps with respect to each of the others thereof, which will be exemplified in the method hereinafter disclosed, and the scope of the invention will be indicated in the claims.

In the practice of the invention a mixture of salts of hydroxy organic acids, as the tartaric acids, saccharic, citric, lactic acids, and the like for example, as their calcium salts, or a mixture of the acids, is dissolved in a concentrated solution, i. e. of 34° to 47° Bé.—which may be referred to as a brine—of a highly soluble salt of a metal that forms a highly soluble chloride and an insoluble salt of the hydroxy organic acid, as tartaric acid, whereby double compounds as calcium dextro tartrate-calcium chloride are formed, and separation of salts of the acids effected initially through dilution, which occasion hydrolysis of the least stable double compounds to the normal salts, as calcium dextro tartrate, of the solution thus obtained whereupon the insoluble normal salt precipitates out. The thus separated normal salt is removed as by filtration and the non-hydrolyzed or more stable double compounds remaining in solution may be converted into the corresponding insoluble basic salts by reaction with an alkaline hydroxide, which basic salts yield a corresponding acid upon treatment thereof with a stronger acid desirably an inorganic acid such as hydrochloric, sulphuric, phosphoric, and the like. The concentrated solution with which the organic acid or salt mixture is treated may be of a chloride of a metal that forms an insoluble salt with the organic acid and especially the chlorides of calcium, strontium, magnesium, and zinc. It was discovered, however, that they are all readily soluble to clear solutions in calcium chloride brines of over 39° Bé.

When these brine solutions, containing the double compounds, are diluted with water, the normal salts, e. g. calcium dextro tartrate, are reprecipitated without change. The amount and rate of reprecipitation varies widely with the dilution and with the nature of the hydroxy acid. By proper control of the dilution of the brine solution, calcium dextro tartrate may be separated from the other components of the mixed salts in an amount which is quantitative for all practical purposes. In the same manner calcium meso-tartrate may be separated, largely, although not quantitatively from the balance of the components present.

Complete precipitation from the brine may be obtained immediately by the addition of a small amount of slaked lime, 10 to 30% of the mixed acids or salts thereof, as all the acids present form very insoluble basic salts, and the brine may thus be completely cleared of organic material for recovery and re-use. This recovery is accomplished merely by neutralizing the alkaline spent brine with a little acid, such as hydrochloric acid, and evaporating to the original Baumé.

I have thus found that, for example two new soluble double compounds of calcium dextro tartrate $4H_2O$ and calcium meso-tartrate $3H_2O$ and calcium chloride are produced by treating with a concentrated solution thereof, i. e. of a concentration sufficient to form the double compounds. Both of these are hydrolyzed by water with precipitation of the normal salts. However, under certain conditions the calcium meso-tartrate calcium chloride double compound may be stabilized and held in solution. This is illustrated by the following:

When 1 gram of calcium dextro tartrate $4H_2O$ is added to 5 cc. of molten calcium chloride $6H_2O$ (melting point 30°) and gently warmed, a bright, clear solution is formed which is stable to further heating or to indefinite standing at room temperature. Water may be added to the solution up to 1.2 cc., where the solution sets with evolution of heat to a translucent gel. This gel is completely reversible, forming a clear solution on heating and setting again on cooling. Addition of more water up to 5 cc. produces permanent precipitation and at 10 cc. the calcium dextro-tartrate $4H_2O$ is precipitated quantitatively as the normal salt.

One gram of calcium meso-tartrate $3H_2O$ and 5 cc. of molten calcium chloride $6H_2O$ forms a solution very readily on gently warming, but on further warming heavy precipitation occurs. This precipitate does not dissolve again on cooling.

A mixture of the two salts in the ratio of ⅔ gram calcium dextro tartrate and ⅓ gram calcium meso tartrate and 5 cc. molten calcium chloride $6H_2O$ forms a clear solution. It is stable to heat and the calcium meso-tartrate is no longer precipitated. The solution does not gel as with calcium dextro tartrate alone. When diluted with 10 cc. water, the calcium dextro tartrate is precipitated in about 95% purity and the calcium meso-tartrate-double compound remains in solution.

Somewhat more particularly, the separation of a mixture of calcium salts of the tartaric acids may be brought about by dissolving 10 grams thereof in about 75 cc. of a calcium chloride brine of 39.16° Bé. followed by dilution to 150 cc. giving a Baumé of 24.17°, then allowing the diluted solution to remain standing for about three days prior to filtering. The precipitated salt was removed and a basic precipitation effected in the filtrate by the addition thereto of about 3 grams of calcium hydroxide. The precipitates obtained were analyzed by decomposing the calcium salts with an excess of oxalic acid, removing the oxalic acid excess, half neutralizing with potassium hydroxide, and crystallizing the potassium acid salts from water and methanol. The salts were examined by titration and optical rotation, and the residues which would not crystallize were reconverted into the calcium salts. The following results were obtained:

|  | Calcium Dextro Tartrate $4H_2O$ | Calcium Racemate $4H_2O$ | Calcium Meso Tartrate $3H_2O$ | Unidentified |
|---|---|---|---|---|
| *Neutral Precipitation from Brine by Dilution* |  |  |  |  |
| As KH salt from water | 5.95 | 0.29 |  |  |
| As KH salt from 50% Methanol | 0.19 | 0.14 |  |  |
| Residue |  |  | 0.13 | 0.17 |
| Total by dilution | 6.14 | 0.43 | 0.13 | 0.17 |
| *Basic Precipitation from Brine* |  |  |  |  |
| As KH salt from water | 0.04 |  |  |  |
| As KH salt from 50% Methanol | 0.32 |  | 1.37 |  |
| Residue |  |  | 0.52 | 0.47 |
| Total as Basic Salt | 0.36 |  | 1.89 | 0.47 |
| Total Recovered | 6.50 | 0.43 | 2.02 | 0.64 |

The foregoing tabulation indicates that of the total amount of dextro tartaric and racemic acids 94.9% was present in the precipitate following dilution, and the purity thereof was 95.2%.

As an illustrative embodiment of a manner in which the invention may be practiced, the following description is presented:

*Separation of calcium dextro, racemic and meso-tartrates and calcium saccharate*

One thousand pounds of the mixed salts were dissolved by heating and stirring in a 2,500 gallon low pressure steam jacketed kettle by means of a calcium chloride brine containing 7,500 pounds of $CaCl_2.6H_2O$ and 300 gallons of water until a clear solution was obtained. The time required for solution was about ten minutes and the volume about 900 gallons. The solution so obtained was immediately diluted without cooling through the addition with stirring of about 900 gallons of water, in other words, in a ratio of solution to water of one to one. After standing for several days crystallization from the diluted brine was substantially complete. The crystalline material was filtered and washed with cold water to free it from calcium chloride. The material was coarsely crystalline, washed easily, weighed about 700 pounds, and was substantially all calcium dextro tartrate. The filtrate from the foregoing filtration consisting of about 2,000 gallons was heated to about 100° C. and about 300 pounds of calcium hydroxide were added with stirring. A finely divided precipitate of basic salts of meso-tartaric and saccharic acid formed and was allowed to settle prior to filtering. The separation of the basic salts frees the brine practically of organic material. The precipitate was washed with hot water, and it amounted to about 600 pounds. It is advisable to collect the wash water separately since it reduces the amount of evaporation in recovering the brine.

The basic salts so obtained were broken up by stirring into 600 gallons of hot water whereupon about 110 gallons of concentrated hydrochloric acid were added and stirring continued until a clear solution resulted. A 20% solution of sodium hydroxide was then added to the hot solution in a thin stream and at a rate such that the locally formed basic salt redissolves and does not accumulate. Sodium hydroxide is added until about 95% of the acid is neutralized, and this may require about 750 gallons of the 20% solution. Following addition of the sodium hydroxide, the reaction mass was cooled, and allowed to stand whereupon crystallization takes place. It was filtered and washed to free it from soluble chlorides. The material thus obtained amounted to about 200 pounds and was approximately 90% calcium meso-tartrate with 3 molecules of water. The spent brine may be recovered by adding concentrated hydrochloride acid thereto to give the pH value possessed by the original brine, and then evaporated to the original volume of 900 gallons. The brine remains clear and water white, and inasmuch as it contains little or no organic matter, it may be reused with small additions to restore the original strength.

The foregoing procedure effects a substantially complete separation of the mixed tartrates, and in carrying out the process, the following factors should be considered. The original brine should be neutral to methyl red, that is a pH value of about 5.1, and it should contain no appreciable amount of other metals particularly the alkali metals. The concentration of the brine may vary somewhat from 39° Bé., but it has been found that the concentration range should be from about 34° to about 47° Bé. However, a concentration of about 39° Bé. is preferred. The dilution with an equal amount of water has been found to be the minimum which will yield all of the calcium dextro and racemic tartrates. If a greater dilution is effected, an amount of meso-tartrate will be precipitated whereas if the dilution is to a lesser extent, as about one-third, all of the racemate will be precipitated in admixture with some of the dextro tartrate. The precipitation of the salts from the diluted brine with respect to time is shown in the following tabulation.

|  | Mixed Salt Sample A | Mixed Salt Sample B |
| --- | --- | --- |
|  | Per Cent | Per Cent |
| After 1 hour | 63.6 | 60.8 |
| After 24 hours | 68.3 | 65.4 |
| After 3 days | 70.0 | 65.9 |
| After 1 week | 73.8 | 76.2 |
| Total Ca Tartrate 4H2O present | 70.3 | 69.7 |

In the event that it is desired to remove the precipitated tartrate after standing for less than twenty-four hours, then any non-precipitated dextro tartrate will be recovered with the meso-tartrate. Further a longer standing than three days has been found not to be advisable due to increased precipitation of the meso-tartrate.

If it is desired not to effect precipitation of the basic salts, a further dilution of the brine may be made, and thereupon crystallization of the meso-tartrate takes place. However, this crystallization is slow and requires at least a week for 70% separation. An advantage of this procedure resides in the fact that it yields calcium meso-tartrate in a very pure condition thus rendering a recrystallization unnecessary, and the free acid solution obtained from it crystallizes easily and may be carried through to dryness without a syrupy residue.

The basic salt is approximately two-thirds mesotartrate and one-third other material. This other material includes saccharic acid lactone and some dextro tartaric acid which escaped the first precipitation. The greater part, however, consists of non-crystalline acids of unknown composition. Further, the basic salt may be decomposed directly with sulphuric acid, but the presence of so large an amount of non-crystalline material hinders recovery of the meso-tartaric acid by increasing the density of the syrup which occasions slow crystallization. Moreover, neutralization of the reaction mass containing the basic salt may be effected with aqueous ammonia, and when so conducted there is a lesser local formation of the basic salt.

If it is desired to recover a further amount of calcium meso-tartrate from the filtrate following separation of the basic salt, this may be brought about by adding calcium hydroxide to the filtrate whereby a further precipitation as basic salts takes place. In order to determine the amount of hydrochloric acid which should be added to the alkaline brine to restore the pH value, the change of methyl red from yellow to just red has been found to be sufficiently accurate.

Moreover, a fractional precipitation from the original solution may be effected by adding graduated amounts of water thereto which occasions separation of calcium racemate due to the ready hydrolysis of the calcium racemate-calcium chloride complex, and thereby a separation of the racemic acid from the dextro tartaric acid is brought about.

It has been found that a rapid and complete recovery of calcium meso-tartrate may be accomplished by extracting the basic salt precipitate with a brine of about 39° Bé. concentration. Inasmuch as the dextro tartaric acid has been removed, the quantity of brine required for treatment of the basic salt is considerably reduced. This procedure may be carried out by reducing the reaction mass containing the basic salts formed by treatment with calcium hydroxide to a relatively thick paste and adding thereto about 300 gallons of 39° Bé. calcium chloride brine. The mixture is then brought to a pH value of about 5.1 through the introduction of about 50 gallons of concentrated hydrochloric acid. This is followed by heating nearly to the boiling point for twenty minutes and then cooling. The reaction mixture so obtained is filtered, pressed, and washed with about 50 gallons of a 39° Bé. brine. The filter cake so obtained is thoroughly disintegrated by stirring with 300 gallons of cold water, filtered again, and washed with water with a yield of about 150 pounds. The filtrate is now diluted to about 1,500 gallons, allowed to stand for a period from twelve to sixteen hours during which precipitation occurs, and the precipitate removed by filtering and washed. There is thus obtained a further quantity of meso-tartrate in an amount of about 100 pounds. The brine filtrate may be treated for reuse through the addition of hydrochloric acid to give the original pH value, and then evaporated to the initial volume.

In the foregoing presentation a mixture of about 70% calcium dextro-tartrate 4H2O and about 30% calcium meso-tartrate 3H2O has been utilized for illustrative purposes. The method, however, will vary in details in the event that the salts in other ratios are separated. Thus, it was found that over a range of 25 to 35% calcium meso tartrate in the mixture a highly satisfactory separation is effected. Mixtures having less than 25% calcium meso-tartrate show precipitation of pure calcium dextro tartrate-calcium chloride double compound which increases in amount with decreasing meso content. Mixtures containing more than 35% calcium meso-tartrate precipitate the corresponding pure meso compound in amounts increasing to nearly quantitative when the dextro content reaches zero.

Consequently, the change required in the separation process to adapt it to any ratio of meso and dextro is a filtration operation before diluting the brine. The double compound separating will be either all dextro or all meso depending on the ratio of the two present. Because of the momentary solubility of these double compounds in water, the filter cake should be washed with undiluted brine rather than water. A short lixiviation of the filter cake with water following the washing recovers the normal calcium salt.

Recovery from mixtures of calcium meso and dextro tartrates is illustrated in the following table. It is to be noticed that the process is not as efficient in recovering the minor component as the major one, whether this be meso or dextro.

*Distribution of normal calcium salt in mixtures of calcium meso tartrate 3H₂O and calcium dextro tartrate 4H₂O with 750 cc. 38% calcium chloride solution per 100 grams of calcium salt*

[Percent composition of mixtures]

| | | 100 | 90 | 70 | 50 | 30 | 10 | 0 |
|---|---|---|---|---|---|---|---|---|
| Calcium Meso | | 100 | 90 | 70 | 50 | 30 | 10 | 0 |
| Calcium Dextro | | 0 | 10 | 30 | 50 | 70 | 90 | 100 |
| From the undiluted brine as double calcium chloride compound by heating for 20 min., filtering, and lixiviation with an excess of water. | As calcium meso double compound. | 98.0 | 76.0 | 55.4 | 25.4 | none | none | none |
| | As calcium dextro double compound. | none | none | none | none | none | 50.0 | 70.8 |
| From dilution of the filtered brine with 750 cc. H₂O | As normal calcium dextro. | 0.6 | 2.4 | 23.0 | 43.6 | 65.6 | 35.2 | 25.2 |
| From dilution further with a second 750 cc. H₂O | As normal calcium meso. | none | 14.6 | 12.4 | 21.2 | 24.6 | 2.6 | 1.2 |
| Recovered | Total | 98.6 | 93.0 | 90.8 | 90.2 | 90.2 | 87.8 | 97.2 |
| Material remaining dissolved | | 1.4 | 7.0 | 9.2 | 9.8 | 9.8 | 12.2 | 2.8 |
| Percent recovered of— Calcium Meso | | 98.0 | 100.7 | 96.9 | 93.2 | 82.0 | 26.0 | |
| Calcium Dextro | | | 24.0 | 76.8 | 87.2 | 93.7 | 94.7 | 96.0 |

Moreover, a series of experiments in which mixtures of salts of hydroxy organic acids were treated with the concentrated salt solution by recycling the solution demonstrates that efficient separation could be made in this manner. No additions were made to the concentrated solution or brine, it being merely evaporated and made up to volume after each recovery. The procedure in outline was:

a. 100 gms. of mixed salt were treated with 750 cc. of calcium chloride solution of about 39° Bé. with heating and stirring to complete the solution.

b. Added 750 cc. water and continued stirring for two hours, cooling with circulating tap water.

c. Filtered and washed with water, the washings being retained for diluting the next cycle at step b.

d. Added 10 gms. technical slaked lime to the filtrate.

e. Heated with stirring, 30 minutes.

f. Cooled with stirring, 30 minutes.

g. Filtered and washed.

h. Filtrate adjusted to pH 5.1 (methyl red) with 20° Bé. technical HCl.

i. Filtrate evaporated en vacuo to 750 cc., agitating with an air stream admitted through a course capillary.

j. Repeat a, etc.

Furthermore, the method may be applied for the separation of hydroxy from non-hydroxy acids, e. g. of oxalic acid from the tartaric acids or from lactic acid inasmuch as the calcium salts thereof as calcium oxalate are not dissolved in the concentrated salt solution especially the calcium chloride brine.

The procedure hereinabove described is attended by many advantages among which may be mentioned that it is economical because the separations are practically quantitative with the dextro and meso-tartaric acids and the saccharic acids being obtained as their substantially pure calcium salts. Further the precipitates are easily filtered and readily washed; the calcium chloride brine may be evaporated to the desired Baumé after the precipitates have been separated therefrom and the brine accordingly reused; any calcium salt remaining in the calcium chloride brine is returned to the cycle of operations, and hence any loss in the desired acids would be limited merely to mechanical losses; the salts obtained are white and yield colorless solutions, and any acid which is not fully separated, such as a small amount of meso-tartaric acid in the dextro portion, is recovered in the crystallization of the free acids as a residue which may be returned to the process.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. A method for the separation of hydroxy organic acids which comprises quantitatively separating such acids by dissolving a mixture of salts of hydroxy organic acids in a concentrated solution of a highly soluble salt of a metal forming a highly soluble chloride and an insoluble salt of the organic acid to form a metal salt of such organic acid which is soluble in a concentrated solution but insoluble in a dilute solution of said highly soluble metal salt, diluting the solution so produced with ensuing precipitation of said metal salt, removing precipitated salt, converting the unprecipitated organic acids into insoluble basic salts by reaction with an alkaline hydroxide, removing basic salts so produced, and converting them into the corresponding acids through treatment with an inorganic acid.

2. A method for the separation of hydroxy organic acids which comprises quantitatively separating such acids by dissolving a mixture of hydroxy organic acids in the form of calcium salts in a concentrated calcium chloride solution having a pH value of about 5.1 to form a salt of such organic acid which is insoluble in a concentrated solution but insoluble in a dilute solution of calcium chloride, diluting the solution so produced with ensuing precipitation of such salt, removing precipitated salt, converting the unprecipitated organic acid into insoluble basic salts by reaction with calcium hydroxide at a temperature of about 100° C., removing basic salts so produced, and converting them into the corresponding acids by treatment with an inorganic acid.

3. A method for the separation of hydroxy organic acids which comprises quantitatively separating such acids by dissolving a mixture of tartrates in a concentrated solution of a highly soluble salt of a metal forming a highly soluble chloride and an insoluble tartrate, to form dextro and racemic tartrates which are soluble in a concentrated solution but insoluble in a dilute solution of said highly soluble metal salt, diluting the solution so produced with ensuing precipitation of such dextro and racemic tartrates, removing precipitated salts, converting unprecipitated meso-tartaric acid into its insoluble basic salt by reaction with an alkaline hydroxide, removing basic salt so produced, and converting it into meso-tartaric acid by treatment with a stronger acid.

4. A method for the separation of hydroxy organic acids which comprises quantitatively separating such acids by dissolving a mixture of calcium tartrates under the influence of heat and stirring in a calcium chloride brine of about 34° to about 47° Bé., to form calcium dextro and racemic tartrates which are soluble in a concentrated solution but insoluble in a dilute solution of calcium chloride, diluting the solution thus formed with substantially an equal volume of water with ensuing separation of normal calcium dextro and racemic tartrates by precipitation, removing precipitated dextro and racemic tartrates, converting unprecipitated meso-tartaric acid into its insoluble basic salt by reaction with calcium hydroxide, removing basic mesotartrate so produced and converting it into meso-tartaric acid by treatment with an inorganic acid.

5. A method for the separation of hydroxy organic acids which comprises quantitatively separating such acids by dissolving a mixture of calcium tartrates in a calcium chloride brine of about 34° to about 47° Bé., to form dextro and racemic tartrates which are soluble in a concentrated solution but insoluble in a dilute solution of calcium chloride, diluting the solution so produced with ensuing separation of normal calcium dextro and racemic tartrates by precipitation, removing the precipitated tartrates, converting unprecipitated meso-tartaric acid into its insoluble basic salt by reaction with calcium hydroxide, reducing the reaction mixture to a paste, treating the paste so obtained with calcium chloride brine of about 39° Bé., adding hydrochloric acid thereto to give a pH value of about 5.1, heating, and then cooling whereupon a meso-tartrate separates as a precipitate.

6. In a method for the separation of hydroxy organic acids the improvement which comprises dissolving a mixture of salts of hydroxy organic acids in a concentrated solution of a highly soluble salt of a metal which forms a highly soluble chloride and an insoluble salt of the organic acid to form a metal salt of such organic acid which is soluble in a concentrated solution but insoluble in a dilute solution of said highly soluble metal salt, and diluting the solution so obtained with ensuing separation of such metal salt by precipitation.

7. In a method for the separation of hydroxy organic acids the improvement which comprises a quantitative separation thereof including the steps of dissolving a mixture of salts of hydroxy organic acids in a solution of a highly soluble salt of a metal which forms a highly soluble chloride and an insoluble salt of the organic acid having a concentration from about 34° to about 47° Bé. and a pH value of about 5.1.

8. In a method for the separation of hydroxy organic acids the improvement which comprises a quantitative separation thereof including the step of dissolving a mixture of calcium tartrates in a calcium chloride solution having a concentration from about 34° to 47° Bé. and a pH value of about 5.1.

9. In a method for the separation of tartaric acids the improvement which comprises a quantitative separation thereof including the steps of dissolving a mixture of calcium tartrates in a concentrated calcium chloride solution to form dextro and racemic tartrates which are soluble in a concentrated solution but insoluble in a dilute solution of calcium chloride, and diluting the solution so obtained with ensuing separation of calcium dextro tartrate by precipitation.

10. In a method for the separation of hydroxy organic acids the improvement which comprises a quantitative separation thereof including the step of dissolving a mixture of hydroxy organic acids in the form of their calcium salts in a solution of calcium chloride having a concentration from about 34° to about 47° Bé.

11. As a composition of matter, a metal salt of a hydroxy organic acid which is soluble in a concentrated solution but insoluble in a dilute solution of a highly soluble salt of a metal which forms a highly soluble chloride and an insoluble salt of the organic acid.

12. As a composition of matter, a calcium salt of a tartaric acid which is soluble in a solution of calcium chloride having a concentration from about 34° to about 47° Bé. but insoluble in a dilute solution thereof.

13. A method for the separation of hydroxy organic acids which comprises quantitatively separating tartaric acids by dissolving a mixture of calcium tartrates in a calcium chloride brine of about 34° to about 47° Bé. with formation of tartrates which are soluble in a concentrated solution but insoluble in a dilute solution of calcium chloride, diluting the solution thus formed with ensuing separation of calcium dextro and racemic tartrates by precipitation, removing the precipitated tartrates, and further diluting the solution with ensuing separation of calcium meso-tartrate by precipitation and removing the meso-tartrate so produced.

WILLIAM E. BARCH.

REFERENCES CITED

The following references are of record in the file of this patent:

UNITED STATES PATENTS

| Number | Name | Date |
|---|---|---|
| 1,425,605 | Odell | Aug. 15, 1922 |
| 1,870,472 | Stokes et al. | Aug. 9, 1932 |
| 2,382,288 | Braun et al. | Aug. 14, 1945 |

OTHER REFERENCES

Paul: Zeitschrift für Electrochemie, Bd. 21, pp. 548–549 (1915).